(12) United States Patent
Ko et al.

(10) Patent No.: US 11,349,145 B2
(45) Date of Patent: May 31, 2022

(54) BATTERY CASE, SECONDARY BATTERY, AND METHOD FOR MANUFACTURING SAME

(71) Applicant: LG CHEM, LTD., Seoul (KR)

(72) Inventors: Joon Sang Ko, Daejeon (KR); Chang Bum Ahn, Daejeon (KR); Young Joo Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 372 days.

(21) Appl. No.: 16/698,564

(22) Filed: Nov. 27, 2019

(65) Prior Publication Data
US 2020/0099088 A1 Mar. 26, 2020

Related U.S. Application Data

(62) Division of application No. 15/579,335, filed as application No. PCT/KR2016/013967 on Nov. 30, 2016, now Pat. No. 10,530,005.

(30) Foreign Application Priority Data

Dec. 16, 2015 (KR) .................. 10-2015-0180248
Nov. 24, 2016 (KR) .................. 10-2016-0157558

(51) Int. Cl.
*H01M 10/04* (2006.01)
*H01M 10/0585* (2010.01)
(Continued)

(52) U.S. Cl.
CPC ... *H01M 10/0436* (2013.01); *H01M 10/0585* (2013.01); *H01M 50/116* (2021.01);
(Continued)

(58) Field of Classification Search
CPC ......... H01M 10/0436; H01M 10/0585; H01M 50/116; H01M 50/147; H01M 50/148;
(Continued)

(56) References Cited

U.S. PATENT DOCUMENTS

2005/0048365 A1* 3/2005 Miyahisa ............ H01M 50/536
29/623.2
2009/0305133 A1 12/2009 Yoon et al.
(Continued)

FOREIGN PATENT DOCUMENTS

JP       2000-340265 A     12/2000
KR    10-2003-0059930 A     7/2003
(Continued)

OTHER PUBLICATIONS

European Search Report for Appl. No. 16875951.2 dated Apr. 25, 2018.
(Continued)

*Primary Examiner* — Stewart A Fraser
(74) *Attorney, Agent, or Firm* — Birch, Stewart, Kolasch & Birch, LLP

(57) ABSTRACT

The present invention relates to a secondary battery. The secondary battery comprises: an electrode assembly having a through-hole; and a battery case accommodating the electrode assembly and having a through-type opening into which the through-hole is inserted, wherein the battery case comprises: a lower case comprising an accommodation part accommodating the electrode assembly and a lower inner sealing part having the through-type opening into which the through-hole is inserted; and an upper case comprising a cover part coupled to an upper portion of the lower case to finish the accommodation part and an upper inner sealing part having a coupling hole to which a front end of the lower inner sealing part is coupled.

5 Claims, 9 Drawing Sheets

(51) Int. Cl.
  *H01M 50/116* (2021.01)
  *H01M 50/147* (2021.01)
  *H01M 50/148* (2021.01)
  *H01M 50/183* (2021.01)
  *H01M 4/02* (2006.01)

(52) U.S. Cl.
  CPC ....... *H01M 50/147* (2021.01); *H01M 50/148* (2021.01); *H01M 50/183* (2021.01); *H01M 2004/025* (2013.01); *H01M 2220/00* (2013.01)

(58) Field of Classification Search
  CPC . H01M 50/183; H01M 50/105; H01M 50/186
  See application file for complete search history.

(56) References Cited

U.S. PATENT DOCUMENTS

| | | | |
|---|---|---|---|
| 2011/0250485 A1 | 10/2011 | Tsukuda | |
| 2013/0244093 A1* | 9/2013 | Min | H01M 50/14 |
| | | | 429/185 |
| 2014/0106193 A1 | 4/2014 | Kim et al. | |
| 2015/0044536 A1 | 2/2015 | Kwon et al. | |
| 2017/0237045 A1* | 8/2017 | Kim | H01M 50/103 |
| | | | 429/179 |

FOREIGN PATENT DOCUMENTS

| | | |
|---|---|---|
| KR | 10-2007-0087276 A | 8/2007 |
| KR | 10-0958649 B1 | 5/2010 |
| KR | 10-1297858 B1 | 8/2013 |
| KR | 10-2013-0105272 A | 9/2013 |
| WO | WO 2013/137611 A1 | 9/2013 |

OTHER PUBLICATIONS

International Search Report for PCT/KR2016/013967 (PCT/ISA/210) dated Mar. 3, 2017.

* cited by examiner

BATTERY CASE, SECONDARY BATTERY, AND METHOD FOR MANUFACTURING SAME

CROSS-REFERENCE TO RELATED APPLICATION

The present application is a divisional of copending application Ser. No. 15/579,335, filed Dec. 4, 2017, which is the National Phase under 35 U.S.C. § 371 of International Application No. PCT/KR2016/013967, filed on Nov. 30, 2016, which claims the benefit of the priority of Korean Patent Application Nos. 10-2015-0180248, filed on Dec. 16, 2015, and 10-2016-0157558, filed on Nov. 24, 2016, all of which are hereby expressly incorporated by reference in their entirety.

TECHNICAL FIELD

The present invention relates to a battery case, a secondary battery and a method for manufacturing the same, and more particularly, to a battery case which is maximized in space utilization of an opening, a secondary battery and a method for manufacturing the same.

BACKGROUND ART

In general, secondary batteries refer to chargeable and dischargeable batteries, unlike primary batteries that are not chargeable. Such a secondary battery is being widely used in the high-tech electronic fields such as mobile phones, notebook computers, and camcorders.

In recent years, a secondary battery having an opening that vertically passes through a central portion thereof is disclosed.

DISCLOSURE OF THE INVENTION

Technical Problem

A secondary battery comprises an electrode assembly having a vertical through-hole and a pouch case accommodating the electrode assembly and having an opening passing through the through-hole.

Here, the pouch case comprises an outer sealing surface sealing an outer edge and an inner sealing surface sealing a circumferential surface of the opening. The outer sealing surface and the inner sealing surface are heated to be sealed in a state in which top and bottom surfaces are press-fitted at the same time.

However, in the above-described secondary battery, since the outer sealing surface and the inner sealing surface are disposed on the opening, a space of the opening is significantly reduced to deteriorate space utilization of the opening.

The present invention has been made to solve the above-mentioned problem, and an object of the present invention is to provide a battery case in which a pouch case having an opening is improved in structure to prevent a space of the opening from being reduced and thereby to maximize space utilization, a secondary battery and a method for manufacturing the same.

Technical Solution

To achieve the above-described object, a secondary battery according to an embodiment of the present invention comprises: an electrode assembly having a through-hole; and a battery case accommodating the electrode assembly and having a through-type opening into which the through-hole is inserted, wherein the battery case comprises: a lower case comprising an accommodation part accommodating the electrode assembly and a lower inner sealing part having the through-type opening into which the through-hole is inserted; and an upper case comprising a cover part coupled to an upper portion of the lower case to finish the accommodation part and an upper inner sealing part having a coupling hole to which a front end of the lower inner sealing part is coupled.

The upper inner sealing part may have an inner sealing surface having the coupling hole to which the front end of the lower inner sealing part is coupled and a connection surface having an inner end coupled to a bottom surface of the inner sealing surface and an outer end connected to the cover part, and an opening groove may be defined between the inner sealing surface and the connection surface.

The lower inner sealing part disposed on the through-type opening and the inner sealing surface disposed on the opening groove may be press-fitted at the same time to seal the lower inner sealing part and the upper inner sealing part.

The front end of the lower inner sealing part and a top surface of the upper case may have the same height.

A top surface of the upper inner sealing part and a top surface of the cover part may have the same height.

The electrode assembly may comprise a plurality of radical units having through-holes that gradually increase in size, and the plurality of radical units may be stacked upward in order from the radical unit having the smallest size to the radical unit having the largest size, and the upper inner sealing part may be inserted into a space between an inner surface of the through-hole of the lowermost radical unit and an inner surface of the uppermost radical unit of the radical units.

A connection part connecting ends of the lower case and the upper case, which correspond to each other, to each other may be provided.

A lower outer sealing part and an upper outer sealing part, which are sealed to each other, may be disposed on remaining ends except for the ends of the lower case and the upper case, respectively.

A method for manufacturing a secondary battery according to an embodiment of the present invention comprises: a step (a) of manufacturing an electrode assembly having a through-hole; a step (b) of manufacturing a battery case comprising a lower case and an upper case, which are folded with respect to an end, wherein the lower case comprises an accommodation part accommodating the electrode assembly and a lower inner sealing part inserted into the through-hole and having an insertion groove, and the upper case comprises a cover part finishing the accommodation part and an upper inner sealing part having a coupling hole to which a front end of the lower inner sealing part is coupled; a step (c) of inserting the electrode assembly between the lower case and the upper case; a step (d) of sealing the coupled portion between the lower inner sealing part and the upper inner sealing part; and a step (e) of forming cutting a bottom surface of the insertion groove of the lower inner sealing part and a surface of the upper inner sealing part, which are closely attached to each other, to form a through-type opening into which the through-hole is inserted.

The upper inner sealing part may have an inner sealing surface having the coupling hole to which the front end of the lower inner sealing part is coupled and a connection surface having an inner end coupled to a bottom surface of the inner sealing surface and an outer end connected to the cover part, and an opening groove may be defined between the inner sealing surface and the connection surface.

In the step (d), the lower inner sealing part disposed on the insertion groove and the inner sealing surface disposed on the opening groove may be press-fitted at the same time to seal the lower inner sealing part and the upper inner sealing part.

In step (b), a connection part connecting the lower case to the upper case may be disposed on ends of the lower case and the upper case, which correspond to each other, a lower outer sealing part and an upper outer sealing part, which are sealed to each other, may be disposed on remaining ends except for the ends of the lower case and the upper case, respectively, and the step (d) may further comprise a process of sealing the lower outer sealing part and the upper outer sealing part.

The step (a) may comprise a step of manufacturing a plurality of radical units having through-holes that gradually increase in size and a step of stacking the plurality of radical units upward in order from the radical unit having the smallest size to the radical unit having the largest size.

A battery case according to an embodiment of the present invention comprises: a lower case comprising an accommodation part and a lower inner sealing part provided at a center of the accommodation part and having a through-type opening; and an upper case comprising a cover part coupled to an upper portion of the lower case to finish the accommodation part and an upper inner sealing part having a coupling hole to which a front end of the lower inner sealing part is coupled.

The upper inner sealing part may have an inner sealing surface having the coupling hole to which the front end of the lower inner sealing part is coupled and a connection surface having an inner end coupled to a bottom surface of the inner sealing surface and an outer end connected to the cover part, and an opening groove may be defined between the inner sealing surface and the connection surface.

The lower inner sealing part disposed on the through-type opening and the inner sealing surface disposed on the opening groove may be press-fitted at the same time to seal the lower inner sealing part and the upper inner sealing part.

The lower case and the upper case may comprise a connection part connecting ends of the lower case and the upper case, which correspond to each other, to each other and a lower outer sealing part and an upper outer sealing part, which are sealed to each other and respectively disposed on remaining ends except for the ends of the lower case and the upper case.

Advantageous Effects

The secondary battery according to the present invention may comprise the battery case having the through-type opening that vertically passes to secure the large space of the through-type opening and improve the space utilization.

Also, the secondary battery according to the present invention may comprise the battery case comprising the lower case and the upper case. The lower case may comprise the lower inner sealing part having the through-type opening, and the upper case may comprise the upper inner sealing part into which the lower inner sealing part is inserted and coupled. Thus, the large opening of the through-type opening may be secured.

Also, in the battery case according to the present invention, the front end of the lower inner sealing part and the top surface of the upper case may be provided at the same height to prevent the secondary battery from increasing in thickness.

Also, in the battery case according to the present invention, the upper inner sealing part may have the inner sealing surface and the connection surface to more easily seal the lower inner sealing part and the upper inner sealing part.

BRIEF DESCRIPTION OF THE DRAWINGS

FIGS. 5 to 9 are views illustrating a method for manufacturing the secondary battery according to an embodiment of the present invention, wherein, FIG. 5 is a view illustrating a step of manufacturing an electrode assembly, FIG. 6 is a view illustrating a step of manufacturing a battery case, FIG. 7 is a view illustrating a step of inserting the electrode assembly into the battery case, FIG. 8 is a view illustrating a step of sealing the battery case, and FIG. 9 is a view illustrating a step of forming a through-type opening.

MODE FOR CARRYING OUT THE INVENTION

Figure 1:
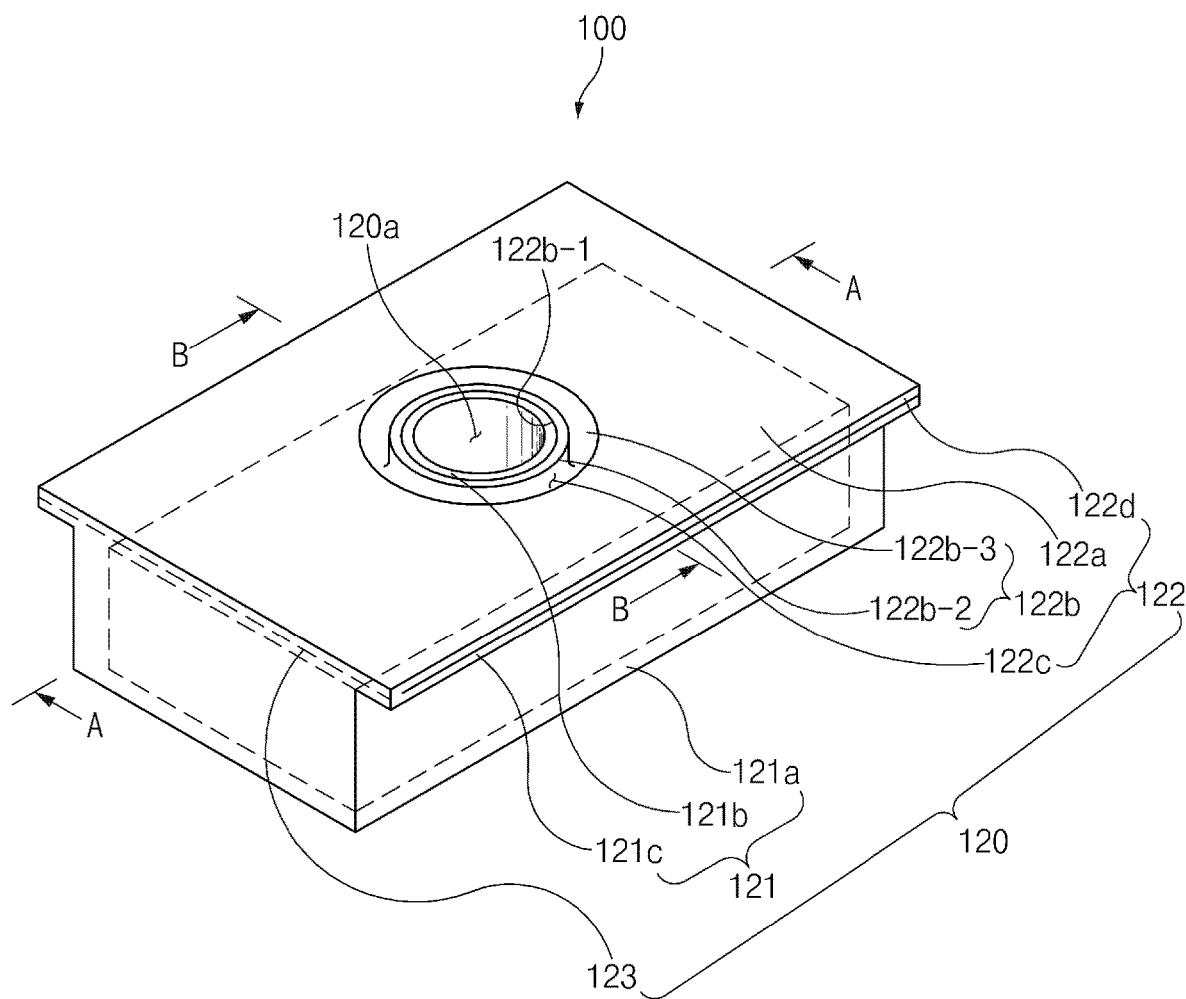
FIG. 1 is a perspective view of a secondary battery according to an embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Secondary Battery According to an Embodiment]

Figure 2:
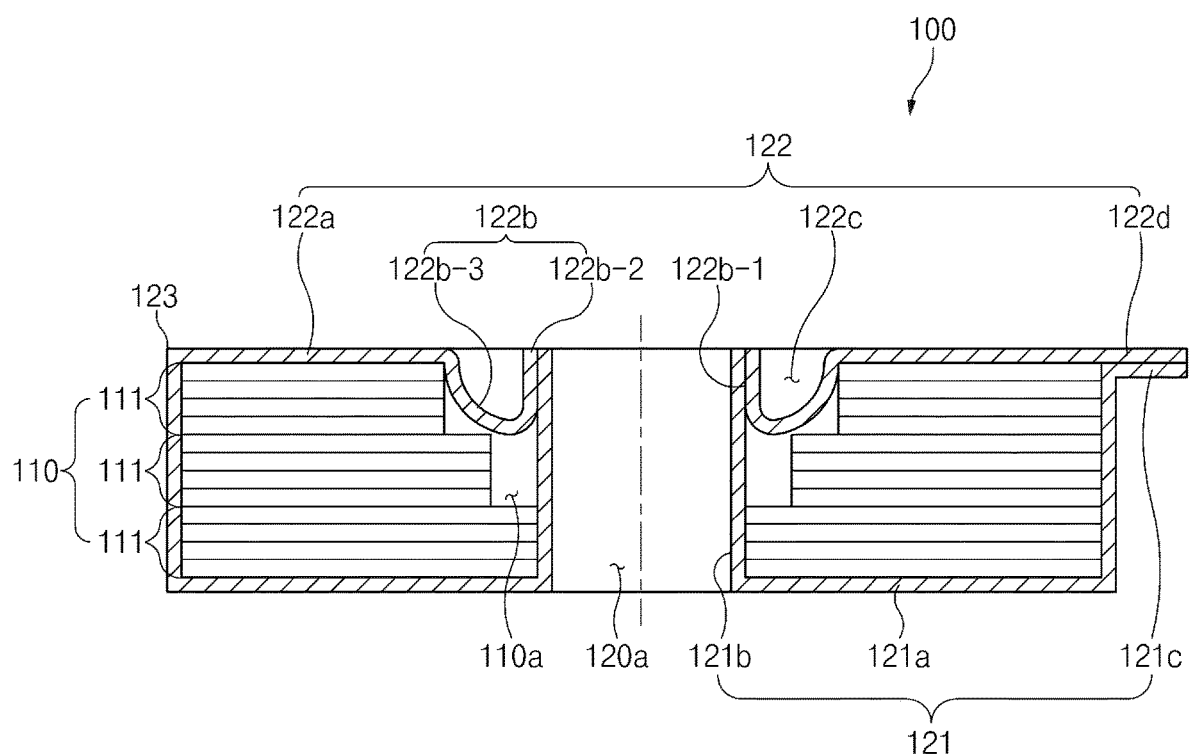
FIG. 2 is a cross-sectional view taken along line A-A of FIG. 1.
Figure 3:
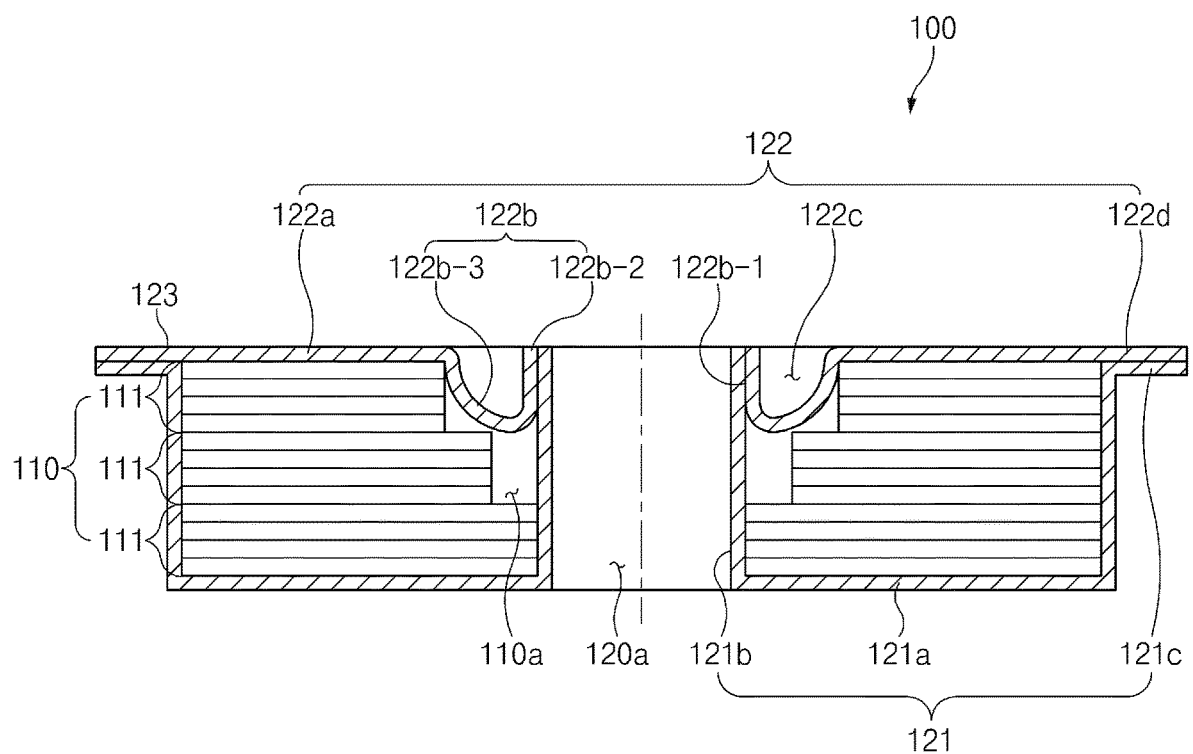
FIG. 3 is a cross-sectional view taken along line B-B of FIG. 1.
Figure 4:
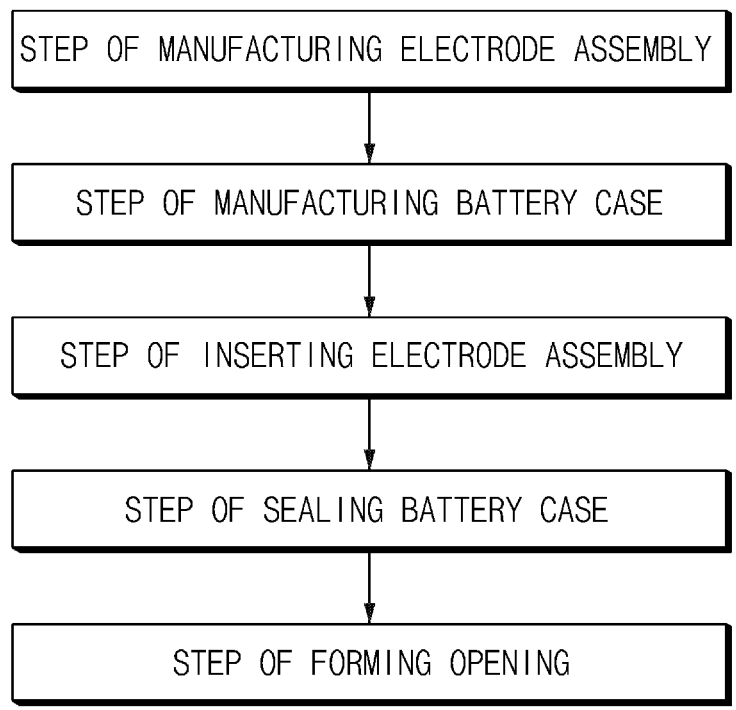
FIG. 4 is a flowchart illustrating a method for manufacturing the secondary battery according to an embodiment of the present invention.

As illustrated in FIGS. 1 to 3, a secondary battery 100 according to an embodiment of the present invention comprises an electrode assembly 110 having a through-hole and a battery case 120 accommodating the electrode assembly 110 and having a through-type opening into which the through-hole is inserted.

Electrode Assembly

Referring to FIG. 2, the electrode assembly 110 comprises a plurality of radical units 111 that are staked in a vertical direction. Each of the plurality of radical units 111 has a structure in which a plurality of electrodes and a plurality of separators are alternately stacked.

Here, the electrode assembly 110 has a through-hole 110a that passes in a direction in which the radical units 111 are stacked. That is, the through-holes defined in the plurality of radical units 111 are stacked to be vertically connected to each other to manufacture the electrode assembly 110 having the through-hole 110a.

The through-holes defined in the plurality of radical units 111 may have different sizes, i.e., sizes that gradually increases. That is, the radical units 111 may be stacked upward from the radical unit 111 having the smallest through-hole to the radical unit 111 having the largest through-hole. Thus, the electrode assembly 110 may have the through-hole 110a having an approximately stepped reversed trapezoidal shape in cross-section.

Battery Case

The battery case 120 accommodates the electrode assembly 110 to be sealed. The battery case 120 comprises a lower case 121 and an upper case 122, which are respectively disposed on top and bottom surfaces of the electrode assembly 110 and coupled to each other to accommodate the electrode assembly 110. Here, the battery case 120 may have a through-type opening 120a into which the through-hole 110a is inserted.

The lower case 121 comprises an accommodation part accommodating the electrode assembly 110 and a lower inner sealing part 121b disposed at a center of the accommodation part 121a and having the through-type opening 120a into which the through-hole is inserted.

Here, the lower inner sealing part 121b has a vertical through-type opening 120a that extends in the same direction as the through-hole 110a. An inner circumferential surface 121a-1 of the through-type opening 120a may be defined as a vertical surface to secure a large space.

Also, a front end of the lower inner sealing part 121b may extend up to a top surface of the through-hole 110a, i.e., at the same height as the upper case 122 to maximally secure a vertical space of the through-type opening 120a.

The upper case 122 is coupled to a top surface of the lower case 121. The upper case 122 comprises a cover part 122a coupled to an upper portion of the lower case 121 to finish the accommodation part 121a and an upper inner sealing part 122b having a coupling hole 122b-1 to which the front end of the lower inner sealing part 121b inserted into the through-hole 110a is coupled. That is, the upper inner sealing part 122b has a coupling hole 122b-1 coupled to the lower inner sealing part 121b to improve coupling between the upper inner sealing part 122b and the lower inner sealing part 121b.

The upper inner sealing part 122b extends downward from the cover part 122a. Here, a space is required for press-fitting and thermally fusing the lower inner sealing part 121b and the upper inner sealing part 122b, which are closely attached to each other. Here, the lower inner sealing part 121b may be press-fitted in a direction of the upper inner sealing part 122b through the opening 120a. On the other hand, the upper inner sealing part may not be press-fitted in a direction of the lower inner sealing part 121b.

Thus, the upper inner sealing part 122b has a shape capable of being press-fitted in the direction of the lower inner sealing part 121b to perform a sealing operation. For example, the upper inner sealing part 122b is provided in a 'U' or 'V' shape in cross-section from the cover part 122a to define an opening groove 122c that is opened upward. Thus, the upper inner sealing part 122b may be press-fitted in the direction of the lower inner sealing part 121b through the opening groove 122c to perform the sealing operation.

In more detail, the upper inner sealing part 122b has an inner sealing surface 122b-2 having a coupling hole 122b-1 to which the front end of the lower inner sealing part 121b is coupled and a connection surface 122b-3 having an inner end coupled to a bottom surface of the inner sealing surface 122b-2 and an outer end folded upward and coupled to the cover part 122a.

That is, the upper inner sealing part 122b has an inner sealing surface 122b-2 and a connection surface 122b-3. An opening groove 122c is defined between the inner sealing surface 122b-2 and the connection surface 122b-3. The inner sealing surface 122b-3 disposed in the opening groove 122c is press-fitted in the direction of the lower inner sealing part 121b to perform the sealing operation.

The upper inner sealing part 122b having the inner sealing surface 122b-2 and the connection surface 122b-3 may protrude downward. The upper inner sealing part 122b protruding downward is inserted into a space between an inner surface of the through-hole of the lowermost radical unit 111 of the electrode assembly 110 and an inner surface of the through-hole of the uppermost radical unit 111. Thus, the upper inner sealing part 122b may be provided without deforming the shape of the electrode assembly 110 or the shape of the battery case 120.

The battery case 120 having the above-described constituents may have the through-type opening 120a into which the through-hole 110a of the electrode assembly 110 is inserted. Particularly, the through-type opening 120a may secure the large space and improve the space utilization because a protruding or projecting portion does not exist on a circumferential surface 121b-1.

The battery case 120 comprises a connection part 123 connecting ends of the lower case 121 and the upper case 122 to each other. That is, in the battery case 120, the upper case 122 may be folded toward the lower case 121 by using the connection part 123 as a center so that the upper case 122 and the lower case 121 are disposed to correspond to each other.

As illustrated in FIG. 3, the battery case 120 comprises a lower outer sealing part 121c and an upper outer sealing part 122d, which are sealed to each other, are disposed on the remaining ends except for the ends of the lower case 121 and the upper case 122 to improve sealability of the lower case 121 and the upper case 122.

The top surface of the upper inner sealing part 122b and the top surface of the cover part 122a have the same height to prevent the battery case 120 from increasing in thickness.

Thus, the battery case 100 according to an embodiment of the present invention may secure the large space of the through-type opening 120a defined in the battery case 120 to improve the space utilization.

In the secondary battery 100 according to an embodiment of the present invention, only the battery case 120 may be commercialized as a separate product.

[Battery Case According to an Embodiment]

That is, the battery case 120 according to an embodiment of the present invention comprises an accommodation part 121a, a lower case 121 comprising a lower inner sealing part 121b disposed at a center of the accommodation part 121a and having a through-type opening 120a, a cover part 122a coupled to an upper portion of the lower case 121 to finish the accommodation part 121a, and an upper case 122 comprising an upper inner sealing part 122b having a coupling hole 122b-1 to which a front end of the lower inner sealing part 121b is coupled.

[Method for Manufacturing Secondary Battery According to an Embodiment]

Hereinafter, a method for a secondary battery according to an embodiment of the present invention will be described.

As illustrated in FIGS. 4 to 9, a method for manufacturing a secondary battery according to an embodiment of the present invention comprises a step (a) of manufacturing an electrode assembly having a through-hole, a step (b) of manufacturing a battery case comprising a lower case and an upper case, which are folded with respect to an end, wherein the lower case comprises an accommodation part accommodating the electrode assembly and a lower inner sealing part inserted into the through-hole and having an insertion groove, and the upper case comprises a cover part finishing the accommodation part and an upper inner sealing part having a coupling hole to which a front end of the lower inner sealing part is coupled, a step (c) of inserting the electrode assembly between the lower case and the upper case, a step (d) of sealing the coupled portion between the lower inner sealing part and the upper inner sealing part, and a step (e) of forming cutting a bottom surface of the insertion groove of the lower inner sealing part and a surface of the upper inner sealing part, which are closely attached to each other, to form a through-type opening into which the through-hole is inserted.

Step (a)

Figure 5:
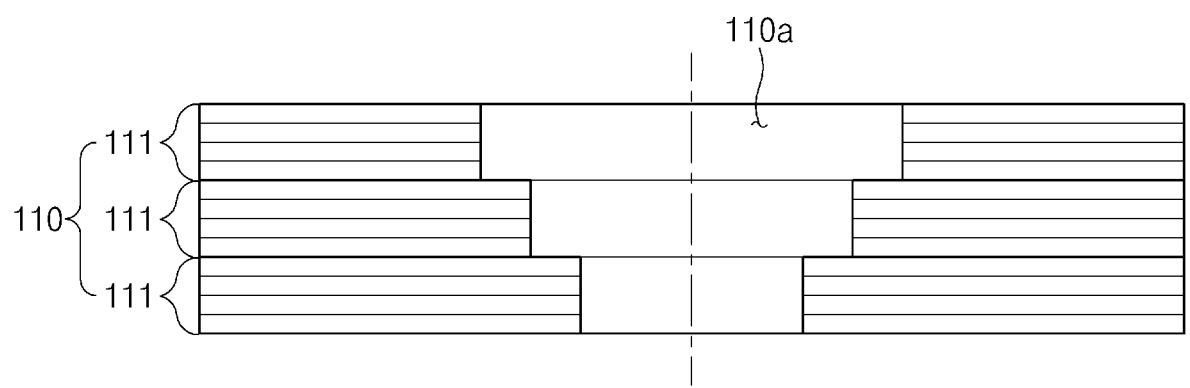

As illustrated in FIG. 5, the step (a) is a step of manufacturing the electrode assembly and comprises a process of manufacturing a plurality of radical units and a process of stacking the plurality of radical units.

In the process of manufacturing the radical units, a plurality of electrodes, each of which has a through-hole, and a plurality of separators, each of which has a through-hole, are alternately stacked to manufacture a radical unit 111. Here, the through-holes of the electrodes and the through-holes of the separators are connected to each other to provide a through-hole in the radical unit 111.

In the process of manufacturing the radical unit, a plurality of radical units 111 having the through-holes that gradually increase in size are manufactured.

In the process of stacking the radical units, the plurality of radical units 111 are stacked to manufacture an electrode assembly 110. Here, the plurality of radical units 111 are stacked upward from the radical unit 111 having the smallest through-hole to the radical unit 111 having the largest through-hole. Thus, the electrode assembly 110 has a through-hole 110a that gradually increases in size upward. That is, referring to FIG. 5, the through-hole 110a may have a shape that increases in size upward in stages.

Step (b)

Figure 6:
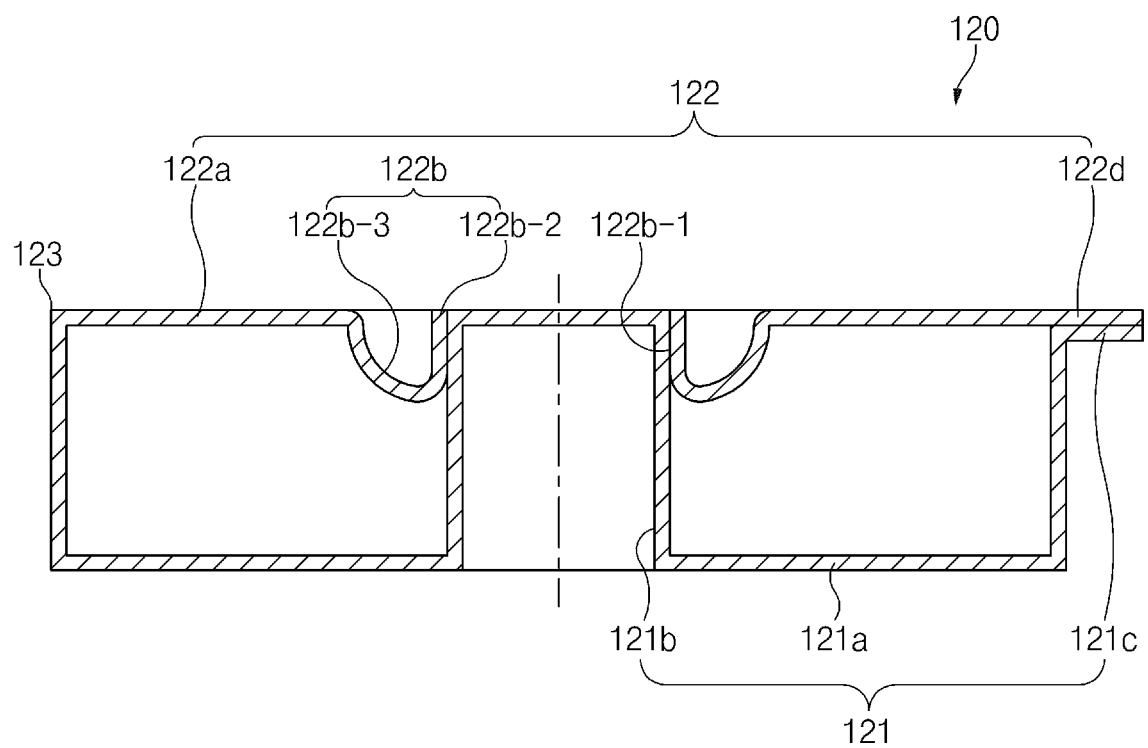

As illustrated in FIG. 6, the step (b) is a step of manufacturing the battery case. In the step (b), a battery case 120 comprising a lower case 121 and an upper case 122, of which ends are connected to each other by a connection part 123, is manufactured.

That is, the battery case 120 is folded so that the lower case 121 and the upper case 122 overlap each other with respect to the ends connecting the lower case 121 to the upper case 122.

Here, the lower case 121 comprises an accommodation part 121a having an accommodation space in a top surface thereof to accommodate the electrode assembly 110 and a lower inner sealing part 121b disposed on a surface (when a bottom surface when viewed in FIG. 6) of the accommodation part 121a, extending upward to be inserted into the through-hole 110a, and having an insertion groove that is opened downward.

The upper case 122 comprises a cover part 122a finishing the accommodation part 121a and an upper inner sealing part 122b having a coupling hole 122b-1 to which a front end of the lower inner sealing part 121b is coupled.

Here, the upper inner sealing part 122b has an inner sealing surface 122b-2 having a coupling hole 122b-1 to which the front end of the lower inner sealing part 121b is coupled and a connection surface 122b-3 having an inner end coupled to a bottom surface of the inner sealing surface 122b-2 and an outer end folded upward and coupled to the cover part 122a. An opening groove 122c is formed between the inner sealing surface 122b-2 and the connection surface 122b-3.

Also, a lower outer sealing part 121c and an upper outer sealing part 122d are formed on remaining ends except for the ends of the lower case 121 and the upper case 122, respectively.

Step (c)

Figure 7:
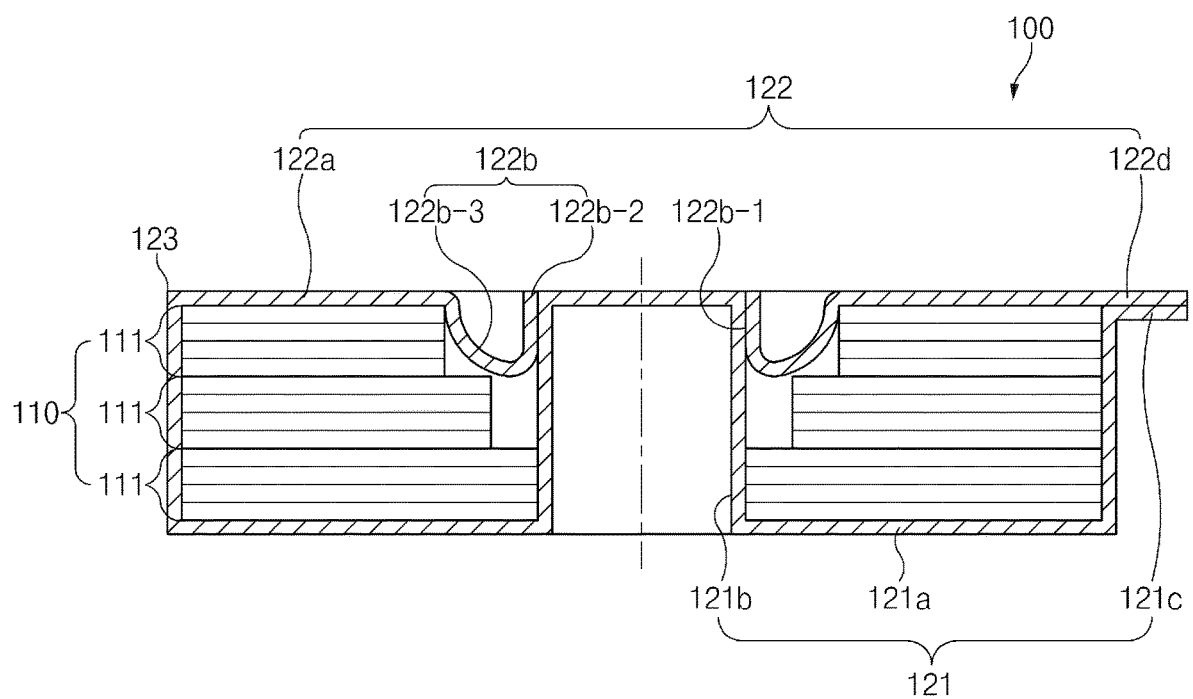

As illustrated in FIG. 7, the step (c) is a step for inserting the electrode assembly into the battery case. In the step (c), the electrode assembly 110 is inserted into the accommodation part 121a of the lower case 121. Here, the lower inner sealing part 121b of the lower case 121 is inserted into the through-hole 110a of the electrode assembly 110 and then coupled to the coupling hole 121b-1 of the upper case 122.

Step (d)

Figure 8:
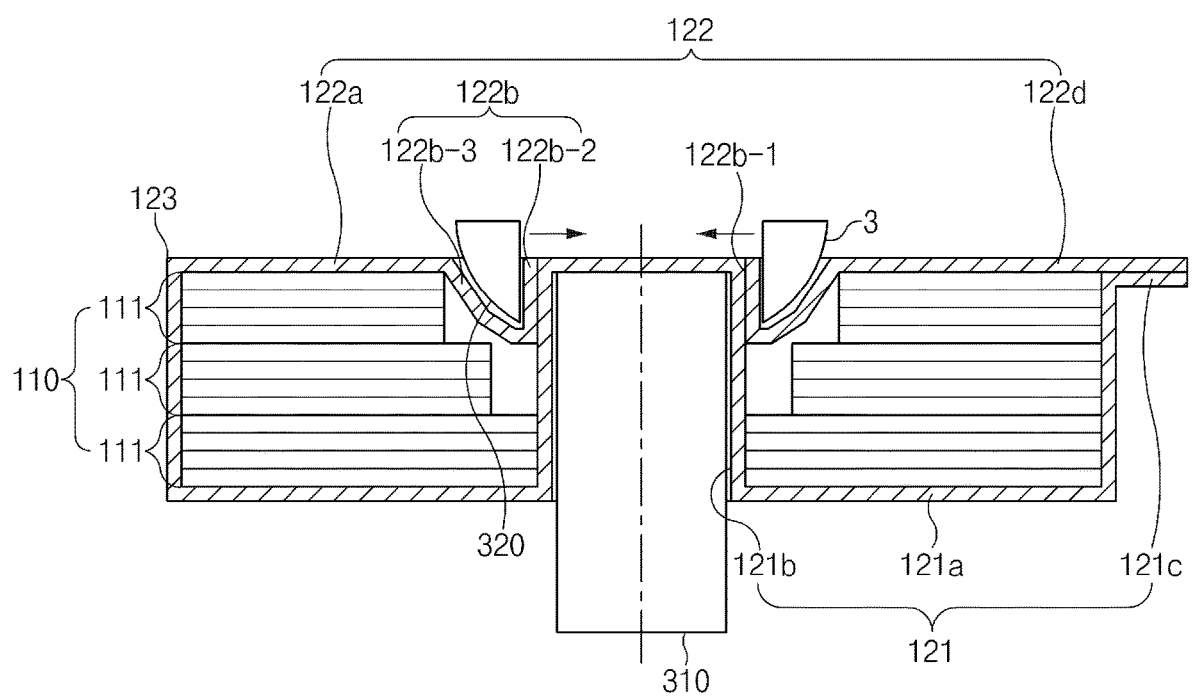

As illustrated in FIG. 8, the step (d) is a step of sealing the battery case. In the step (d), an upper thermal fusion member 320 is disposed in the opening groove 122c of the upper inner sealing part 122b, and a lower thermal fusion member 310 is disposed in the insertion groove of the lower inner sealing part 121b. Then, heat is applied in a state in which the upper thermal fusion member 320 is press-fitted in a direction of the lower thermal fusion member 310 to seal the lower inner sealing part 121b and the upper inner sealing part 122b.

Also, heat is applied in a stat in which the lower outer sealing part 121c and the upper outer sealing part 122d are press-fitted to perform the sealing operation.

Step (e)

Figure 9:
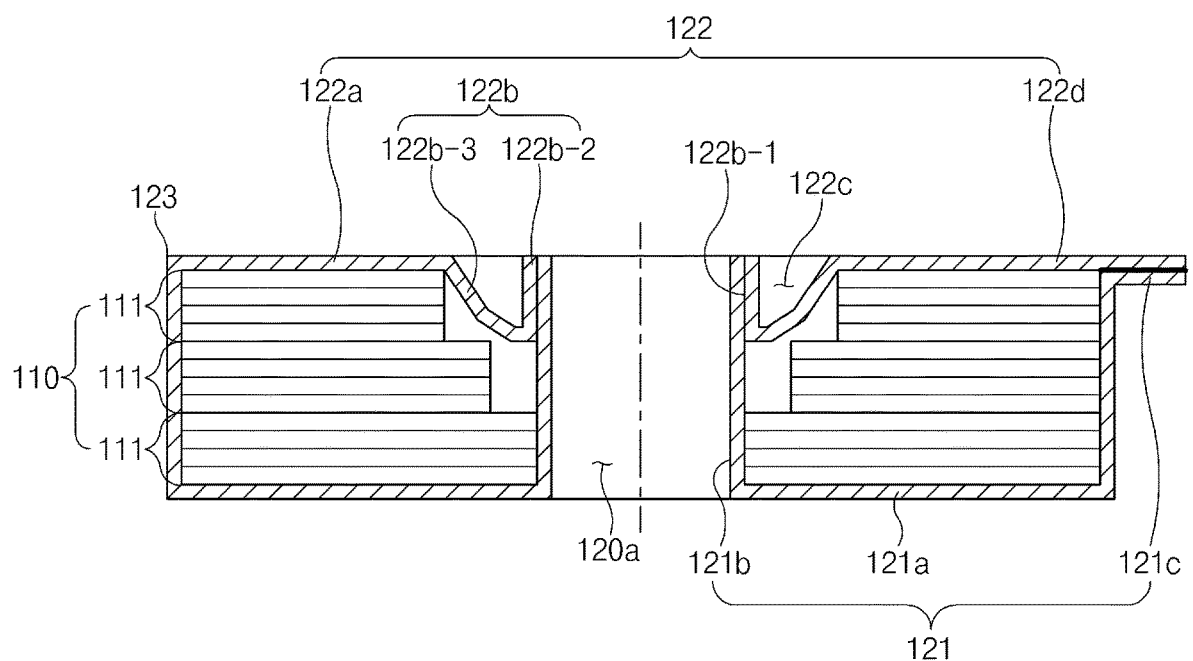

As illustrated in FIG. 9, the step (e) is a step of forming a through-type opening into which the through-hole is inserted. In the step (e), a bottom surface of the insertion groove of the lower inner sealing part 121b is cut. Thus, the through-type opening 121a, into which the through-hole 110a is inserted is formed, to complete the secondary battery 100.

Therefore, in the method for manufacturing the secondary battery according to an embodiment of the present invention, the secondary battery having the through-type opening may be manufactured, and also, the large space of the through-type opening may be secured to improve the space utilization.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A method for manufacturing a secondary battery, the method comprising:
   a step (a) of manufacturing an electrode assembly having a through-hole;
   a step (b) of manufacturing a battery case comprising a lower case and an upper case, which are folded with respect to an end, wherein the lower case comprises an accommodation part accommodating the electrode assembly and a lower inner sealing part inserted into the through-hole and having an insertion groove, and the upper case comprises a cover part finishing the accommodation part and an upper inner sealing part having a coupling hole to which a front end of the lower inner sealing part is coupled;
   a step (c) of inserting the electrode assembly between the lower case and the upper case;
   a step (d) of sealing the coupled portion between the lower inner sealing part and the upper inner sealing part; and
   a step (e) of cutting a bottom surface of the insertion groove of the lower inner sealing part and a surface of the upper inner sealing part, which are closely attached to each other, to form a through-type opening into which the through-hole is inserted.

2. The method of claim 1, wherein the upper inner sealing part has an inner sealing surface having the coupling hole to which the front end of the lower inner sealing part is coupled and a connection surface having an inner end coupled to a bottom surface of the inner sealing surface and an outer end connected to the cover part, and an opening groove is defined between the inner sealing surface and the connection surface.

3. The method of claim 2, wherein, in the step (d), the lower inner sealing part disposed on the insertion groove and the inner sealing surface disposed on the opening groove are press-fitted at the same time to seal the lower inner sealing part and the upper inner sealing part.

4. The method of claim 1, wherein, in step (b), a connection part connecting the lower case to the upper case is disposed on ends of the lower case and the upper case, which correspond to each other, a lower outer sealing part and an upper outer sealing part, which are sealed to each other, are disposed on remaining ends except for the ends of the lower case and the upper case, respectively, and the step (d) further comprises a process of sealing the lower outer sealing part and the upper outer sealing part.

5. The method of claim 1, wherein the step (a) comprises a step of manufacturing a plurality of radical units having through-holes that gradually increase in size and a step of stacking the plurality of radical units upward in order from the radical unit having the smallest size to the radical unit having the largest size.

* * * * *